Sept. 23, 1941.  J. C. VAN SLYKE  2,256,600
ESCAPEMENT MECHANISM FOR SUSTAINED POWER CLOCK AND BEARING
MATERIAL FOR CLOCKS GENERALLY
Filed July 12, 1939
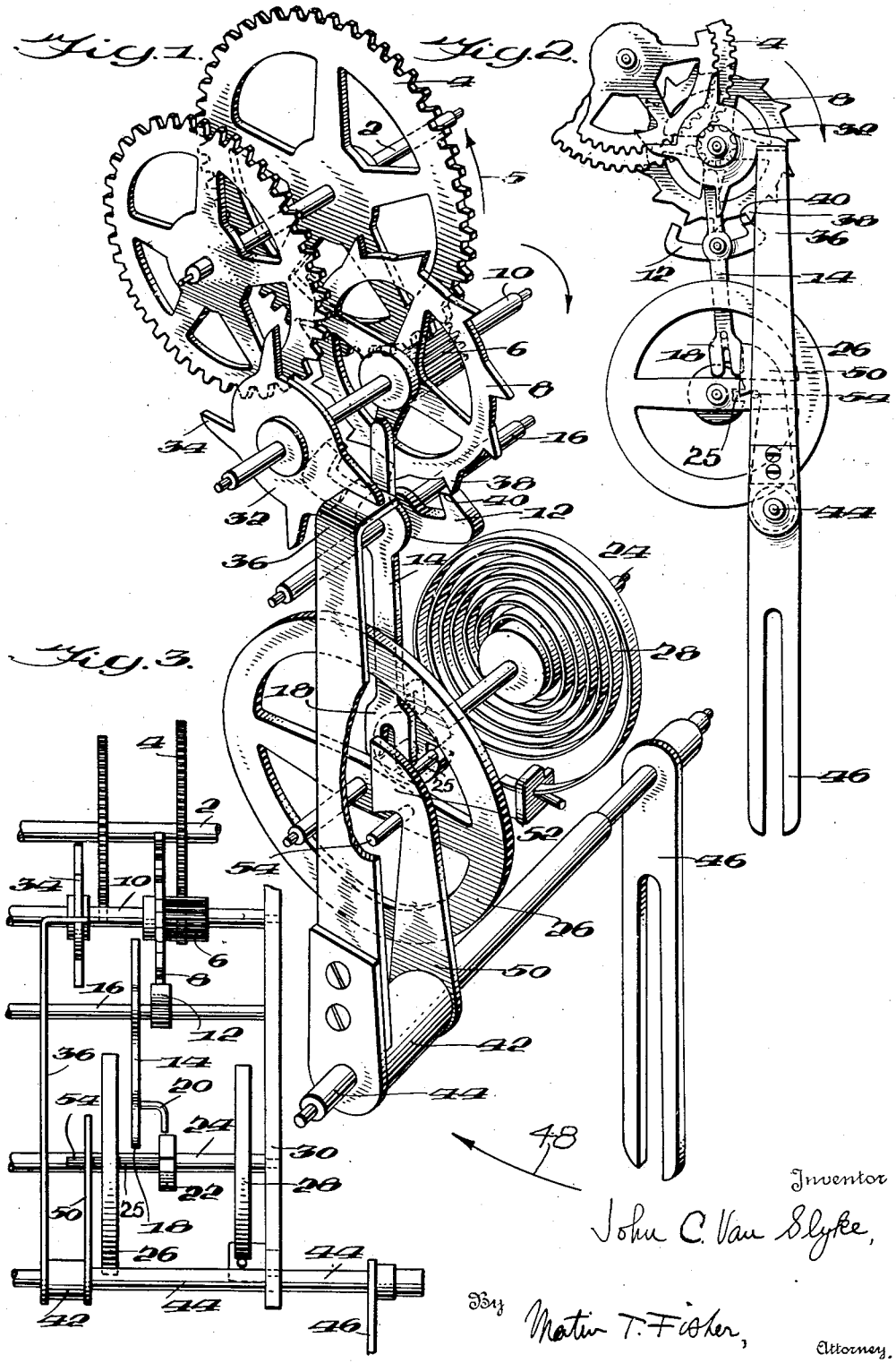

Patented Sept. 23, 1941

2,256,600

UNITED STATES PATENT OFFICE 2,256,600

ESCAPEMENT MECHANISM FOR SUSTAINED POWER CLOCK AND BEARING MATERIAL FOR CLOCKS GENERALLY

John C. Van Slyke, Washington, D. C.; L. Clair Van Slyke, administrator of said John C. Van Slyke, deceased, assignor to Josephine A. Van Slyke, Washington, D. C.

Application July 12, 1939, Serial No. 284,123

7 Claims. (Cl. 58—7)

This invention relates to an escape mechanism for a sustained power clock, and also involves the use of self-lubricating material, preferably self-lubricating metal, in such escape mechanism.

By sustained power clock is meant an electric clock which is driven by a synchronous or other suitable type of motor and provided with a spring drive which, upon failure of the electric power, automatically takes over the operation of the clock and runs it until the electric power comes on again. This general type of clock is well known to the trade, and the present invention is particularly concerned with the escapement mechanism for this type of clock, which escapement mechanism comes into operation upon failure of the electric power.

Escapement mechanisms of this character are normally stationary, that is, do not move for long periods of time. They only come into operation when the electric power fails and, inasmuch as in most communities the electric power is fairly reliable, the escapement mechanism may remain motionless for weeks and months at a time. One result of this is that the oil or other lubricant in the journals of the escapement mechanism may become gummed and hardened, sometimes so much so that when the electric power starts, this gumming and hardening, plus possible accumulation of dust in the bearings and journals of the wheels, will prevent the starting and operation of the escapement mechanism.

This invention has two principal objects, first, to use for the bearings, journals, and arbors of clock wheels generally, and for escapement mechanism in particular, what is known as self-lubricating metal, that is to say, metal in the pores and interstices of which is a lubricant such as oil. The bearing plates forming the bearings and journals for the entire clock mechanism may be made of this self-lubricating metal, but what is especially important is that the bearing plates for the escapement mechanism, which, as has been mentioned above, is motionless for long periods of time, be made of this self-lubricating material.

The second main object of the invention is to provide, in connection with the escapement, two starting devices for positively putting the escapement into motion. My improved escapement preferably employs bearing plates of self-lubricating metal, but it is to be understood that my escapement may or may not employ self-lubricating metal, as desired.

The first of such starting devices comprises a stop mechanism cooperating with the escape wheel and its pallet. The pallet has an impulse face and the stop mechanism cooperates with the escape wheel for stopping it just as a tooth of the escape wheel is coming into engagement with this impulse face of the pallet. The result of this is that, when the escape wheel is released, the tooth that is in such engagement with the impulse face of the pallet gives a kick or push to the pallet which, by virtue of its connection with the balance wheel, starts the balance wheel into motion.

The second of such starting devices comprises a stopping device cooperating with the balance wheel, which will stop the balance wheel and hold it in a position such that the hair spring of the balance wheel is under tension. When the balance wheel is released, the tension from the hair spring will give a kick or push to the balance wheel for starting it into motion.

There are thus provided two stopping and release mechanisms in the escapement mechanism, either one of which will give a starting push to the balance wheel. If for any reason either of these devices alone should fail to start the balance wheel, the cooperative effect of the two will start the balance wheel, although as a matter of practice, either one alone is usually sufficient to start it, especially if self-lubricating metal is used.

The escapement mechanism of the present invention may be made up as a unitary article of manufacture, so that it may be built into known types of electric clocks.

The main features of the invention having been thus outlined, reference will now be made to the accompanying drawing illustrating the present preferred embodiment of the invention.

In the drawing,

Figure 1 is a perspective view on an enlarged scale of the escapement mechanism of the present invention, looking from the bottom of the mechanism, upwardly, for the sake of clarity.

Figure 2 is a fragmentary plan view of the pallet and cooperating parts; and

Figure 3 is a side elevation of Figure 1, looking from the right.

Referring now to the drawing, in which similar reference characters indicate similar parts, the escapement mechanism comprises a shaft 2 provided with a number of gear wheels, on which gear wheels is normally impressed the force of a spring, not shown, tending to turn the gear wheel 4 in the direction of the arrow 5, as is customary in spring driven, sustained power clocks. The wheel 4 drives gear 6 and escape wheel 8, both of which are mounted on the shaft or arbor 10. The escape wheel 8 cooperates with the pallet 12, the pallet arm 14 being carried by the pallet shaft 16. The fork 18 of the pallet has the usual arm 20 cooperating with the member 22 on the balance wheel arbor 24. Fork 18 straddles the impulse pin 25 carried by balance wheel 26, these parts being of standard or usual construction. The balance wheel 26 is mounted on the shaft 24 in the usual way, shaft 24 also carrying the usual hair spring 28.

The several shafts or arbors are journalled in upper and lower bearing plates 30. Only the upper plate 30 is shown Figure 3. These bearing plates are made of self-lubricating material, of a metallic or non-metallic nature. Any suitable self-lubricating metal or material may be used. The use of self-lubricating material in the escapement mechanism of the present invention, is believed to be basically new, and applicant hereby makes broad and basic claims to such use.

The use of bearing plates 30 for the several shafts or arbors of the escapement mechanism represents a distinct advance in this art, in that oil need not be used for the shaft pivots; by the elimination of oil, the hardening and gumming of the oil which tends to lock the shafts after they have been inactive for a long time, is eliminated. Even if the shafts of the escapement mechanism tend to lock or are difficult to start, the two impulse devices that will now be described will serve to start the wheels of the escapement into motion when the mechanism is released by failure of the electric power.

As has been stated, not only may the shafts of the escapement mechanism be journalled and mounted in plates of self-lubricating metal, but the shafts of clocks generally may be mounted in plates of self-lubricating metal.

The impulse mechanism associated with the escape wheel will now be described. The shaft 10 of the escape wheel is provided with a 4 or 5 point stop wheel 32 provided with a plurality of stop teeth 34 which are adapted to engage against a stop arm 36 when that stop arm is in the position shown in Figure 1. The teeth 34 are so positioned that when the stop arm 36 stops the wheel 32, the escapement wheel 8 is stopped at precisely the point where one of the teeth, illustrated in Figure 1 as the tooth 38, is just entering into engagement with the impulse face 40 of the pallet 12. When the electric power fails and the arm 36 releases the wheel 32, the tooth 38 will give a push or impulse to the pallet as it passes across the impulse face 40 thereof and will swing the pallet arbor 16 which will, in turn, move the pallet arm 14 and will give a push or impulse to the balance wheel 36 for starting it into operation.

The stop arm 36 is carried by a sleeve 42 which is fixed to a control shaft 44; the control shaft 44 carries an operating arm 46, which arm 46 is swung to the left, as indicated by the arrow 48, when the electric power fails, to release the wheel 32. When the electric power comes on, arm 46 is swung to the right. Control of the arm 46 as above described is effected in a manner well understood in the art, such as by electromagnetic means or by gravity means, or both.

The starting mechanism for the balance wheel will now be described. This mechanism comprises a stop arm 50 preferably carried by the sleeve 42 and operable therewith; this arm is provided with a hook end 52 which is adapted to engage a pin 54 carried by the balance wheel. The arm 50 is so positioned with relation to the pin 54 that when the arm engages the pin, as shown in Figure 1, the hair spring 28 is under tension. The result of this is that when the arm 50 releases the pin 54, this tension of the hair spring gives a push or impulse to the balance wheel for starting it into operation.

By reason of the fact that the stop arms 36 and 50 are simultaneously operated by the control arm 46, it will be evident that arms 36 and 50 are operated simltaneously. When both of these arms move to the release position, the escape wheel tooth 38 gives a push to the impulse face 40 of the pallet, and the tension of the hair spring gives a push to the balance wheel, both of which movements cooperate to start the mechanism into operation. If one should fail for any reason, the other will start the balance wheel.

There is thus provided an escapement mechanism which is extremely reliable in operation, in that no oil need be used for the several shafts employed in the escapement mechanism by reason of the fact that said shafts are mounted in self-lubricating metal. Therefore, the tendency for the arbors to become locked by gummed oil is practically eliminated, but even if the mechanism is difficult to start, the push to the balance wheel effected by the escape wheel, or the push to the balance wheel effected by the release of the tension on the hair spring, or both of these together, will serve unfailingly to put the escapement mechanism into operation.

While I have illustrated my invention in some detail, it should be understood that it is not to be limited to these precise details, but may be carried out in other ways as set forth in the appended claims.

I claim as my invention:

1. An escapement mechanism for a sustained power clock, which mechanism is normally inoperative for long periods of time comprising clockwork mechanism, including plural arbors and cooperating gears carried by said arbors, bearing plates in which said arbors are journalled, said bearing plates being made of metal impregnated with a lubricant, whereby the arbor journals are automaticallly and continuously lubricated.

2. An escapement mechanism for a sustained power clock, which mechanism is normally inoperative for long periods of time comprising plural arbors, on which are respectively mounted an escape wheel and a balance wheel, bearing plates in which said arbors are journalled, said bearing plates being made of metal impregnated with a lubricant, whereby the arbor journals are automatically and continuously lubricated.

3. An escapement mechanism for a sustained power clock, which mechanism is normally inoperative for long periods of time comprising plural arbors, on which are respectively mounted gear wheels, an escape wheel and a balance wheel, bearing plates in which said arbors are journalled, said bearing plates being made of metal of a porous character, in the pores of which is a lubricant, whereby the arbor journals are automatically and continuously lubricated.

4. An escapement mechanism for a sustained power clock, comprising an escape wheel, a pallet cooperating therewith, said pallet having a beveled impulse face engageable successively with the ends of the teeth on the escape wheel, means acting directly on the escape wheel for stopping the escape wheel just as one of its teeth is beginning to engage the impulse face of the pallet, a balance wheel, and a hair spring for the balance wheel, the tooth of the escape wheel that is in engagement as aforesaid with the impulse face of the pallet serving, when said stopping means is released, to give a push to the pallet and so to start the pallet and balance wheel into motion.

5. An escapement mechanism for a sustained power clock, comprising an escape wheel, a pallet cooperating therewith, said pallet having an impulse face engageable successively with the ends of the teeth on the escape wheel, a shaft on which the escape wheel is mounted, a stop wheel on said shaft, a stop arm cooperating with said stop wheel, said stop wheel and stop arm acting to stop the escape wheel just as one of its teeth is beginning to engage the impulse face of the pallet, a balance wheel, and a hair spring for the balance wheel, the tooth of the escape wheel that is in engagement as aforesaid with the impulse face of the pallet serving, when the escape wheel is released by said stop wheel, to give a push to the pallet for putting the balance wheel into motion.

6. An escapement mechanism for a sustained power clock, comprising an escape wheel, a pallet cooperating therewith, said pallet having an impulse face engageable successively with the ends of the teeth on the escape wheel, means for stopping the escape wheel just as one of its teeth is beginning to engage the impulse face of the pallet, a balance wheel, a hair spring for the balance wheel, the tooth of the escape wheel that is in engagement as aforesaid with the impulse face of the pallet serving, when said stopping means is released, to give a push to the pallet and so to start the pallet and balance wheel into motion, and means for stopping the balance wheel when the hair spring is under tension, whereby when the balance wheel is released, the tensioned balance wheel spring starts the balance wheel into motion, said two stopping means being operable substantially simultaneously, and cooperating by together applying two distinct starting forces to the balance wheel, said two stopping means comprising two stop arms carried by a common shaft, and being operable, when the electric power is on, to stop the escape wheel and balance wheel, and operable, upon failure of the electric power, to release said wheels to start them into motion as aforesaid.

7. An escapement mechanism for a sustained power clock, comprising an escape wheel, a pallet cooperating therewith, a shaft on which the escape wheel is mounted, a stop wheel on said shaft, a stop arm cooperating with said stop wheel, and means, operable upon the failure of the usual drive for the clock, for actuating said stop arm for releasing said stop wheel.

JOHN C. VAN SLYKE.